(12) United States Patent
Dellock et al.

(10) Patent No.: US 10,894,513 B2
(45) Date of Patent: Jan. 19, 2021

(54) BRACKET FOR RUNNING BOARD AND METHOD OF MAKING THE SAME

(71) Applicant: Ford Global Technologies, LLC, Dearborn, MI (US)

(72) Inventors: Paul Kenneth Dellock, Northville, MI (US); Stuart C. Salter, White Lake, MI (US); Richard Gall, Ann Arbor, MI (US); David Brian Glickman, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 809 days.

(21) Appl. No.: 15/609,394

(22) Filed: May 31, 2017

(65) Prior Publication Data
US 2018/0345868 A1 Dec. 6, 2018

(51) Int. Cl.
| | |
|---|---|
| *B60R 3/00* | (2006.01) |
| *B29C 48/00* | (2019.01) |
| *B29C 48/78* | (2019.01) |
| *B29C 48/12* | (2019.01) |
| *B29C 48/91* | (2019.01) |

(Continued)

(52) U.S. Cl.
CPC .......... *B60R 3/002* (2013.01); *B29C 48/0011* (2019.02); *B29C 48/0019* (2019.02); *B29C 48/022* (2019.02); *B29C 48/12* (2019.02); *B29C 48/475* (2019.02); *B29C 48/78* (2019.02); *B29C 48/91* (2019.02); *B29C 48/92* (2019.02); *B29C 2948/92704* (2019.02); *B29C 2948/92923* (2019.02); *B29C 2948/92942* (2019.02); *B29K 2023/0683* (2013.01); *B29K 2105/12* (2013.01); *B29K 2307/04* (2013.01);
(Continued)

(58) Field of Classification Search
CPC ....... B60R 3/002; B29C 48/92; B29C 48/022; B29C 48/78; B29C 48/475; B29C 48/91; B29C 48/0011; B29C 48/0019; B29C 48/12; B29C 33/24; B29C 33/28; B29C 2045/506; B29C 2045/5068; B29C 45/67; B29C 45/6764; B29C 2045/6792; B29C 43/00; B29C 2043/028; B29C 2043/029; B29C 2043/144; B29C 43/18; B29C 43/183; B29C 43/184; B29C 2043/3444; B29C 43/44; B29C 2043/5808; B29C 45/0053; B29C 45/56; B29C 45/561; B29C 2045/5635; B29C 2045/5665; B29C 48/001; B29C 49/4802; B29C 51/044; B29C 53/564; B29C 53/566; B29C 61/006; B29C 67/04
See application file for complete search history.

(56) References Cited

U.S. PATENT DOCUMENTS

| | | | | | |
|---|---|---|---|---|---|
| 3,847,888 | A | * | 11/1974 | Baumgaertner | ...... B29C 43/006 428/220 |
| 4,731,199 | A | * | 3/1988 | Matsuo | ................. B29C 70/882 252/511 |

(Continued)

*Primary Examiner* — Stella K Yi
(74) *Attorney, Agent, or Firm* — David Coppiellie; Carlson, Gaskey & Olds, P.C.

(57) ABSTRACT

A method of forming a component for a vehicle according to an exemplary aspect of the present disclosure includes, among other things, forming the component of an ultra-high-molecular-weight-polyethylene (UHMWPE) and a stiffening filler. A bracket and a running board assembly are also disclosed.

15 Claims, 4 Drawing Sheets

(51) Int. Cl.

| | | |
|---|---|---|
| *B29C 48/92* | (2019.01) | |
| *B29C 48/475* | (2019.01) | |
| *B29L 31/30* | (2006.01) | |
| *B29K 23/00* | (2006.01) | |
| *B29K 309/00* | (2006.01) | |
| *B29K 307/04* | (2006.01) | |
| *B29K 309/08* | (2006.01) | |
| *B29K 105/12* | (2006.01) | |

(52) U.S. Cl.
CPC ...... *B29K 2309/08* (2013.01); *B29K 2309/14* (2013.01); *B29L 2031/30* (2013.01); *B60Y 2410/122* (2013.01)

(56) References Cited

U.S. PATENT DOCUMENTS

| | | |
|---|---|---|
| 5,286,576 A * | 2/1994 | Srail .................. B32B 27/18 |
| | | 428/517 |
| 6,513,821 B1 | 2/2003 | Heil |
| 6,997,469 B2 | 2/2006 | Lanoue et al. |
| 7,000,932 B2 | 2/2006 | Heil et al. |
| 9,174,579 B2 | 11/2015 | Iorgovan |
| 9,487,159 B2 | 11/2016 | Achenbach |
| 2003/0085544 A1* | 5/2003 | Heil .................. B60R 3/002 |
| | | 280/163 |
| 2005/0222303 A1* | 10/2005 | Cernohous .............. C08L 23/06 |
| | | 524/13 |
| 2005/0287891 A1* | 12/2005 | Park ..................... B29C 70/465 |
| | | 442/59 |
| 2006/0266780 A1 | 11/2006 | Armstrong et al. |
| 2012/0068759 A1* | 3/2012 | Clark ..................... G01L 1/205 |
| | | 327/517 |
| 2014/0206808 A1* | 7/2014 | Guastala ................ C08K 3/013 |
| | | 524/431 |
| 2016/0090453 A1* | 3/2016 | Mathur .................. B32B 27/32 |
| | | 264/175 |

\* cited by examiner

BRACKET FOR RUNNING BOARD AND METHOD OF MAKING THE SAME

BACKGROUND

This disclosure relates to a bracket for a running board and a method of making the same.

Sport utility vehicles (SUVs), trucks, and other vehicles, such as four wheel drive (4WD) vehicles, have a relatively high ground clearance, meaning the floor is at a relatively high elevation above the ground. The increased ground clearance makes it difficult for some users to enter and exit the vehicle.

Running boards are known, and have been used to provide users with assistance when entering and exiting vehicles with a high ground clearance. Running boards are typically connected to a vehicle body by a metal bracket.

SUMMARY

A method of forming a component for a vehicle according to an exemplary aspect of the present disclosure includes, among other things, forming the component of an ultra-high-molecular-weight-polyethylene (UHMWPE) and a stiffening filler.

In a further non-limiting embodiment of the foregoing method, the forming step includes extruding the component using a hydraulic ram.

In a further non-limiting embodiment of any of the foregoing methods, the forming step includes mixing a UHMWPE powder with the stiffening filler and feeding the mixture into an extruder.

In a further non-limiting embodiment of any of the foregoing methods, the forming step includes heating the mixture, within the extruder, as the hydraulic ram applies pressure to the mixture to extrude the component.

In a further non-limiting embodiment of any of the foregoing methods, the extruded component is heated to between about 280° F. and 300° F. (between about 138° C. and about 149° C.), shaped, and allowed to cool.

In a further non-limiting embodiment of any of the foregoing methods, the extruded component is shaped into a bracket for connecting a running board to a vehicle body.

In a further non-limiting embodiment of any of the foregoing methods, the forming step includes compression molding the component.

In a further non-limiting embodiment of any of the foregoing methods, the forming step includes mixing a UHMWPE powder with the stiffening filler and placing the mixture in a molding cavity.

In a further non-limiting embodiment of any of the foregoing methods, the stiffening filler includes at least one of glass fibers, basalt fibers, and carbon fibers.

In a further non-limiting embodiment of any of the foregoing methods, the stiffening filler includes a combination of basalt fibers and carbon fibers, each of the basalt fibers and carbon fibers having a length between about 12 mm and about 25 mm (between about 0.5 inches and about 1.0 inches).

In a further non-limiting embodiment of any of the foregoing methods, the component is further formed of a coupling agent, a coloring concentrate, and an ultraviolet (UV) light stabilizer.

In a further non-limiting embodiment of any of the foregoing methods, the coupling agent is an organofunctional silane, the coloring concentrate is carbon black, and the UV light stabilizer is a hindered amine light stabilizer.

In a further non-limiting embodiment of any of the foregoing methods, the component is a bracket for connecting a running board to a vehicle body.

A bracket for connecting a running board to a vehicle body according to another exemplary aspect of the present disclosure includes, among other things, an ultra-high-molecular-weight-polyethylene (UHMWPE) and a stiffening filler.

In a further non-limiting embodiment of the foregoing bracket, the stiffening filler includes at least one of glass fibers, basalt fibers, and carbon fibers.

In a further non-limiting embodiment of any of the foregoing brackets, the fibers have a length between about 12 mm and about 25 mm (between about 0.5 inches and about 1.0 inches).

In a further non-limiting embodiment of any of the foregoing brackets, the stiffening filler includes a combination of basalt fibers and carbon fibers, each of the basalt fibers and carbon fibers having a length between about 12 mm and about 25 mm (between about 0.5 inches and 1.0 inches).

In a further non-limiting embodiment of any of the foregoing brackets, the bracket includes a running board attachment portion and a vehicle body attachment portion inclined substantially perpendicular to the running board attachment portion, and the bracket includes a bend between the running board attachment portion and the vehicle body attachment portion.

A running board assembly according to another exemplary aspect of the present disclosure includes, among other things, a running board and a bracket connected to the running board. The bracket is formed of an ultra-high-molecular-weight-polyethylene (UHMWPE) and a stiffening filler.

In a further non-limiting embodiment of the foregoing running board assembly, the stiffening filler includes at least one of glass fibers, basalt fibers, and carbon fibers, and the fibers have a length between about 12 mm and about 25 mm (between about 0.5 inches and about 1.0 inches).

BRIEF DESCRIPTION OF THE DRAWINGS

FIG. 4 represents an example extrusion process.

FIG. 6 represents an example compression molding process.

DETAILED DESCRIPTION

This disclosure relates to a bracket for a running board and a method of making the same. Running boards, and in turn running board brackets, are commonly found on trucks, sport utility vehicles (SUVs), and other vehicles with a relatively high ground clearance. The disclosed bracket is made of an ultra-high-molecular-weight-polyethylene (UHMWPE) and a stiffening filler. The resultant bracket exhibits a high impact resistance and a high stiffness, while also performing well in low temperatures.

Figure 1:
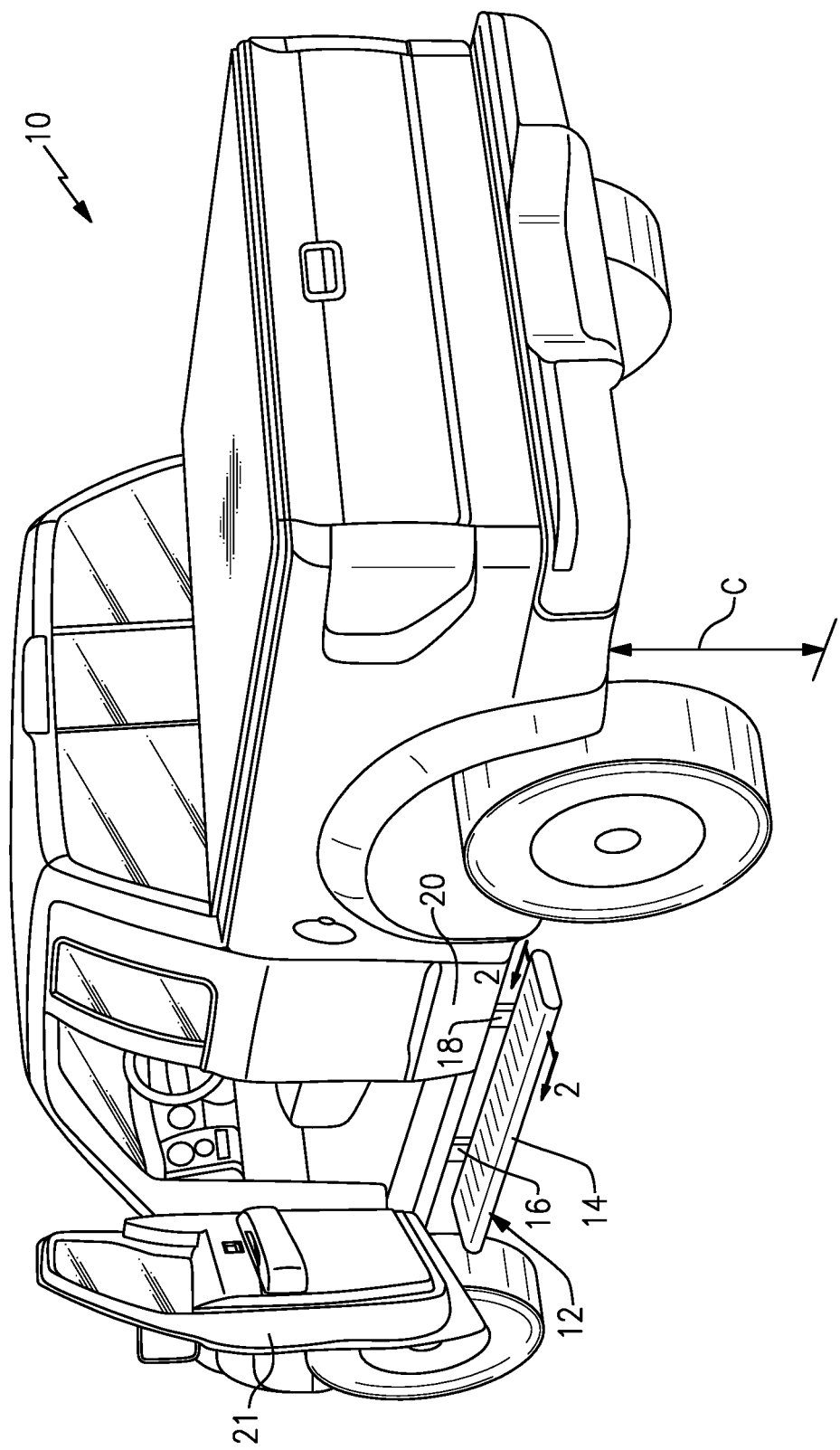
FIG. 1 is a rear-perspective view of a vehicle with an example running board assembly.

Referring to the drawings, FIG. 1 is a rear-perspective view of a motor vehicle 10. The vehicle 10 has a relatively high ground clearance C, which is a distance between a ground surface and a floor of the vehicle 10. As shown, the vehicle 10 is a truck. While a truck is pictured, this disclosure is also applicable to sport utility vehicles (SUVs) and other types of vehicles having a high ground clearance.

The vehicle 10 has a running board assembly 12 including a running board 14 and first and second brackets 16, 18 connecting the running board 14 to a vehicle body 20, which includes the frame and paneling of the vehicle 10. The running board 14 has a length corresponding to a width of a door 21 of the vehicle 10 in one example. The first and second brackets 16, 18 support the running board 14, which allows a user to step on the running board 14 as they enter and exit the vehicle 10. In this example, there are two brackets connected to the running board 14, but it should be understood that this disclosure is not limited to arrangements with two brackets. This disclosure extends to arrangements with one or more brackets.

Figure 2:
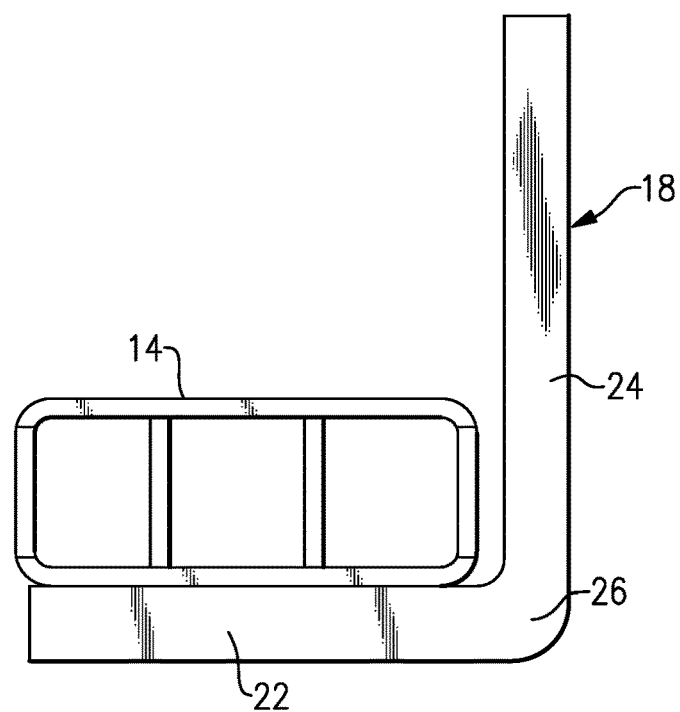
FIG. 2 is a cross-sectional view taken along line 2-2 from FIG. 1 and shows the example running board assembly in more detail.
Figure 3:
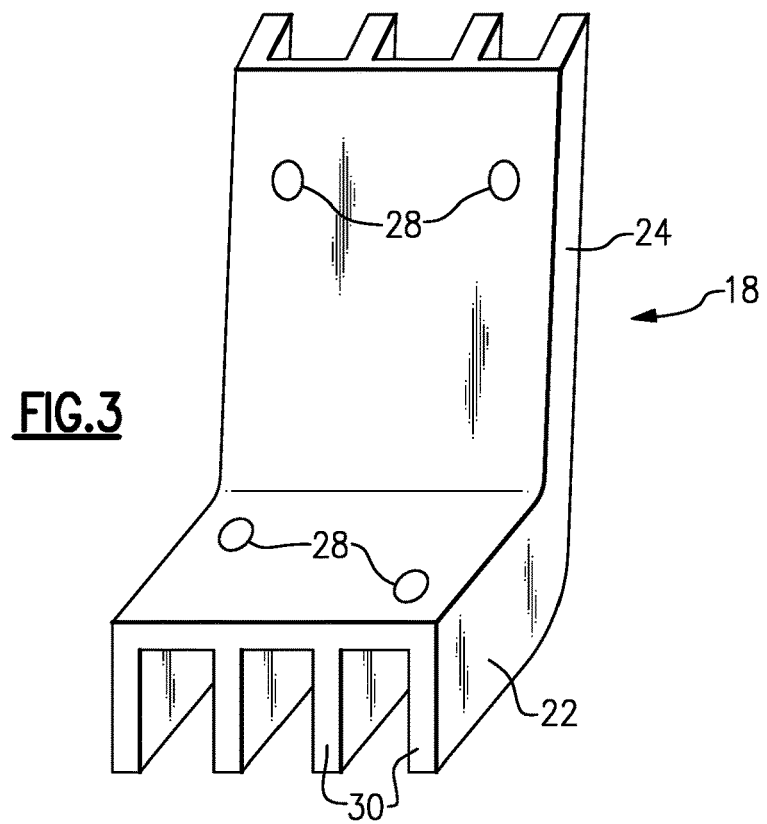
FIG. 3 is a perspective view of an example bracket.

FIG. 2 is a cross-sectional view taken along line 2-2 from FIG. 1, and illustrates the arrangement of the running board 14 relative to one of the running board brackets 18. FIG. 3 illustrates the running board bracket 18 from a perspective view without showing the running board 14 for ease of reference. While FIGS. 2 and 3 illustrate the running board bracket 18, it should be understood that the FIGS. 2 and 3 are representative of the arrangement of the running board bracket 16 as well.

With joint reference to FIGS. 2 and 3, the running board bracket 18 is substantially L-shaped in this example. In particular, the running board bracket 18 includes a running board attachment portion 22 and a vehicle body attachment portion 24 inclined substantially perpendicular to the running board attachment portion 22. The running board bracket 18 includes a bend 26 between the running board attachment portion 22 and the vehicle body attachment portion 24. As shown in FIG. 3, the running board bracket 18 includes apertures 28 in both the running board attachment portion 22 and the vehicle body attachment portion 24. The apertures 28 receive fasteners that couple the running board bracket 18 to the running board 14 and the vehicle body 20. In other examples, there are no apertures, and the running board bracket 18 is attached to the running board 14 and the vehicle body 20 in another manner.

In this example, the running board bracket 18 includes a plurality of ribs 30 as the result of an extrusion process. The ribs 30 increase the overall stiffness of the running board bracket 18. The running board bracket 18 could be provided with a different shape, and this disclosure is not limited to running board brackets having the illustrated shape.

Figure 4:
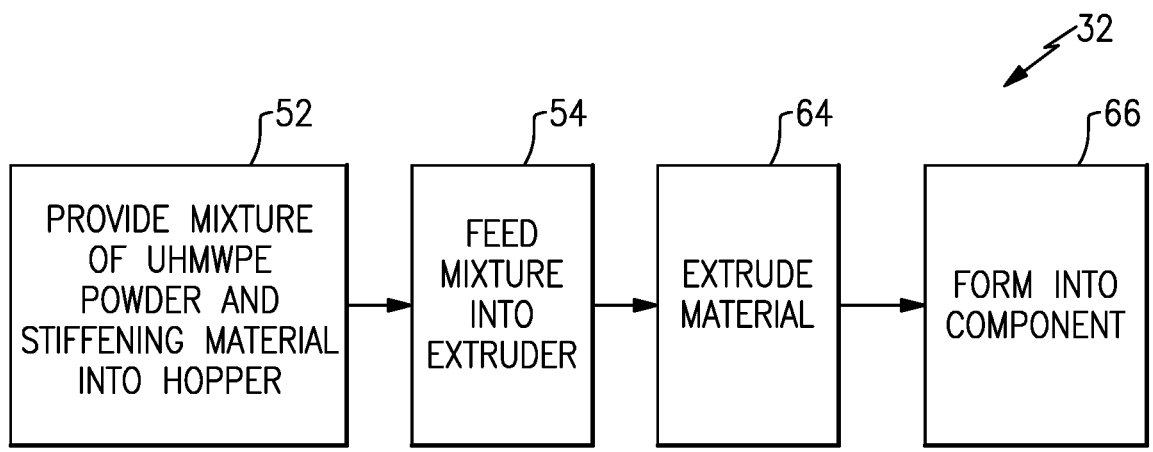
FIG. 4 is a flow chart representative of an example method of making the bracket of FIG. 3. Specifically.

FIG. 4 is a flow chart representative of a first example method of forming a component for a vehicle. In this disclosure, the component is a running board bracket, such as the running board brackets 16, 18. This disclosure is not limited to running board brackets, and extends to other vehicle components that would benefit from increased impact resistance, increased stiffness, and increased performance in low temperatures.

In FIG. 4, the component is formed of a mixture including an ultra-high-molecular-weight-polyethylene (UHMWPE) and a stiffening filler. UHMWPE materials have relatively long polymer chains with a molecular mass usually between 3.5 and 7.5 million unified atomic mass units (amu). The relatively long polymer chain serves to transfer loads effectively, which results in a tough material with high impact strength. When combined with a stiffening filler, the resultant mixture exhibits an increased stiffness and can thus be used to form components that are tough, impact resistant, and stiff enough to function as component for vehicles, such as running board brackets.

Figure 6:
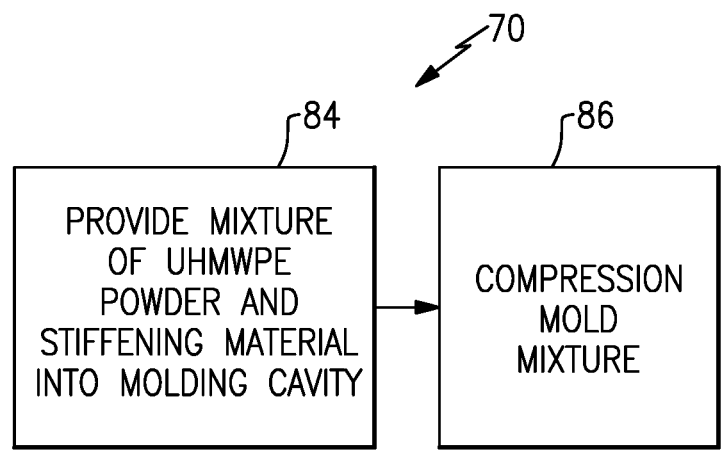
FIG. 6 is a flow chart representative of an example method of making the bracket of FIG. 3. Specifically.

The method 32 of FIG. 4 includes extruding the component using a hydraulic ram. This disclosure is not limited to extrusion, and extends to other methods of manufacture such as compression molding (FIG. 6). Extrusion and compression molding both allow one to form components using UHMWPE without compromising the beneficial material properties of UHMWPE during processing. In other words, these manufacturing methods are less likely to break the relatively long polymer chains found in UHMWPE materials.

Figure 5:
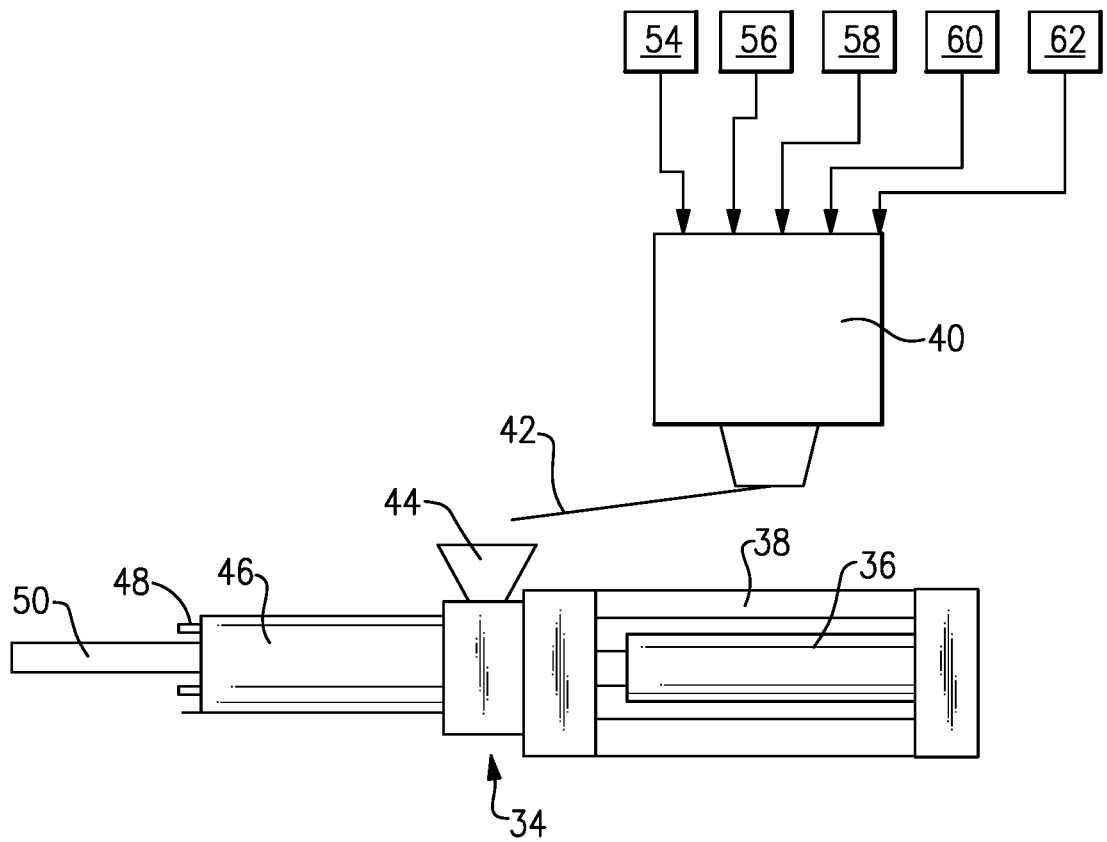
FIG. 5 schematically illustrates an example extruder and associated components.

FIG. 5 schematically illustrates an example extrusion arrangement. The arrangement includes an extruder 34 having a hydraulic ram 36 connected to a frame 38. A mixture of material held in a mixer 40 is selectively fed into the extruder 34 by way of a chute 42 and hopper 44. In one example, the mixer 40 is configured to continuously feed material into the extruder 34. The extruder 34 further includes a heating mantle 46 and a die 48. Upon activation of the hydraulic ram 36, the extruder 34 produces a workpiece 50.

With joint reference to FIGS. 4 and 5, in the method 32, a mixture of at least UHMWPE powder 54 and a stiffening filler 56 is mixed and held in the mixer 40, at 52. In this example, the stiffening filler 56 is provided by at least one of glass fibers, basalt fibers, and carbon fibers. In other words, the stiffening filler 56 could include one or more of glass fibers, basalt fibers, and carbon fibers. If carbon fibers are used, the carbon fibers can be recycled carbon fibers, or can be a combination of new carbon fibers and recycled carbon fibers. The stiffening filler 56, in one example, is made of fibers having a length between about 12 mm and 25 mm (between about 0.5 inches and 1.0 inches). In one particular example, the stiffening filler 56 includes a combination of basalt fibers and carbon fibers, and each of the basalt fibers and carbon fibers have a length between about 12 mm and 25 mm.

In addition to the UHMWPE powder 54 and stiffening filler 56, the mixture within the mixer 40 may also include a coupling agent 58, a coloring concentrate 60, and an ultraviolet (UV) light stabilizer 62. Example coupling agents include organofunctional silanes, such as Siloxane or maleic anhydride grafted polypropylene. The coupling agent 58 serves to couple organic polymers to inorganic materials, which increases the bond between the UHMWPE powder 54 and the stiffening filler 56. The coloring concentrate 60 is carbon black in most examples, since most components are black, however other coloring agents come within the scope of this disclosure. Finally, the UV light stabilizer 62 may be a hindered amine light stabilizer, and serves to protect the produced-component from degradation due to UV exposure.

In one example of this disclosure, the mixture includes 67% UHMWPE powder by mass, and a stiffening filler providing 30% of the mixture by mass. The stiffening filler itself has carbon fibers providing 15% of the mixture by mass and basalt fibers providing 15% of the mixture by mass. Further, 1.5% of the mixture is provided by the coupling agent, and 1.5% is provided by the coloring concentrate and UV light stabilizer (both percentages by mass).

Continuing on with the method 32, at 64 the mixture from the mixer 40 is continuously fed into the extruder 34 during the extrusion process via the chute 42 and hopper 44. At 64, the mixture is heated by the heating mantle 46 and extruded through the die 48 under pressure by the hydraulic ram 36. The resultant workpiece 50 is straight and requires further working to resemble one of the brackets 16, 18, for example. Thus, at 66, in one example the workpiece 50 is heated to between about 280° F. and 300° F. (between about 138° C. and about 149° C.), and is bent to provide substantially an L-shape, as illustrated in FIGS. 2-3. The component is then allowed to cool.

Figure 7:
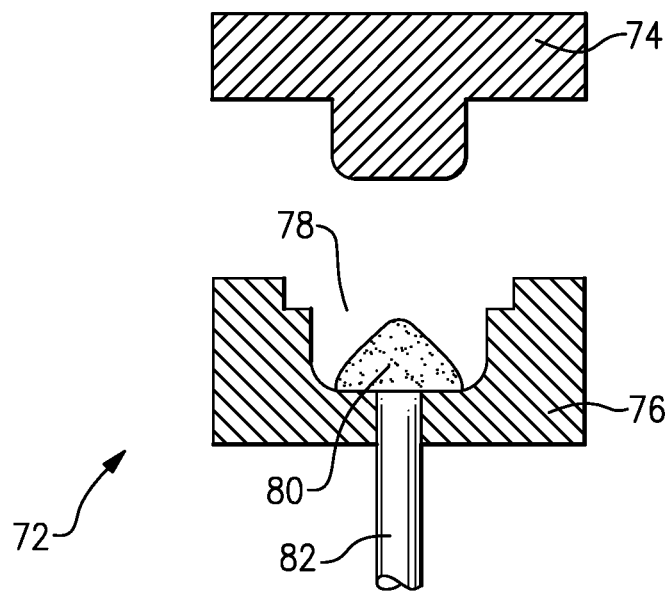
FIG. 7 schematically illustrates as example mold and associated components.

FIG. 6 is a flow chart representative of a second example method 70 of forming a component for a vehicle. FIG. 7 schematically illustrates an example mold 72. With reference to FIG. 7, the mold 72 includes an upper mold half 74 and a lower mold half 76. The lower mold half 76 is shaped to include a mold cavity 78, which is configured to receive a powder mixture 80, such as the mixture described above. The lower mold half 76 may also include a knock-out pin 82 to assist in removal of the workpiece.

In the method 70, at step 84 the powder mixture 80 is provided in the mold cavity 78. Again, the powder mixture 80 can be the same powder mixture described above, including UHMWPE powder, a stiffening filler, a coupling agent, a coloring concentrate, and a UV light stabilizer. At step 86, a compression molding process forms the powder mixture 80 into a component, such as the brackets 16, 18. In one example process, the upper and lower mold halves 74, 76 are pressed together and apply between about 2 MPa and 10 MPa (between about 290 psi and 1,450 psi) of pressure onto the powder mixture while the mold 72 is held at a temperature between about 200° C. and 230° C. (between about 392° F. and 446° F.).

The components produced from either of the above-discussed processes provide increased durability and increased temperature resistance. In particular, the produced components exhibit an increased ductility and retain their ductility even in low temperatures, such as −40° C. (−40° F.). The produced components are also have a relatively low density, which leads to significant weight reductions. In one example, the produced component exhibits a density about 13% that of steel and results in about a 50% reduction in weight relative to steel.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method of forming a component for a vehicle, comprising:

forming the component of an ultra-high-molecular-weight-polyethylene (UHMWPE) and a stiffening filler, wherein the component is a bracket configured to connect a running board to a body of the vehicle, wherein the stiffening filler includes a combination of basalt fibers and carbon fibers, and wherein each of the basalt fibers and carbon fibers have a length between about 12 mm and about 25 mm (between about 0.5 inches and about 1.0 inches).

2. The method as recited in claim 1, wherein the forming step includes extruding the component using a hydraulic ram.

3. The method as recited in claim 2, wherein the forming step includes mixing a UHMWPE powder with the stiffening filler and feeding the mixture into an extruder.

4. The method as recited in claim 3, wherein the forming step includes heating the mixture, within the extruder, as the hydraulic ram applies pressure to the mixture to extrude the component.

5. The method as recited in claim 4, wherein the extruded component is heated to between about 280° F. and 300° F. (between about 138° C. and about 149° C.), shaped, and allowed to cool.

6. The method as recited in claim 5, wherein the extruded component is shaped into a bracket for connecting a running board to a vehicle body.

7. The method as recited in claim 1, wherein the forming step includes compression molding the component.

8. The method as recited in claim 7, wherein the forming step includes mixing a UHMWPE powder with the stiffening filler and placing the mixture in a molding cavity.

9. The method as recited in claim 1, wherein the stiffening filler further includes glass fibers.

10. The method as recited in claim 1, wherein the component is further formed of a coupling agent, a coloring concentrate, and an ultraviolet (UV) light stabilizer.

11. The method as recited in claim 10, wherein the coupling agent is an organofunctional silane, the coloring concentrate is carbon black, and the UV light stabilizer is a hindered amine light stabilizer.

12. The method as recited in claim 2, wherein the extrusion process provides the component with a plurality of ribs.

13. The method as recited in claim 12, further comprising bending the component to provide the component in substantially an L-shape.

14. A method of forming a component for a vehicle, comprising:

forming the component of an ultra-high-molecular-weight-polyethylene (UHMWPE) and a stiffening filler, wherein the component is a bracket configured to connect a running board to a body of the vehicle, and wherein the component is formed of a mixture including, by mass:
67% UHMWPE powder,
30% a stiffening filler,
1.5% coupling agent, and
1.5% coloring agent and UV light stabilizer.

15. The method as recited in claim 14, wherein the stiffening filler includes carbon fibers providing 15% of the mixture by mass and basalt fibers providing 15% of the mixture by mass.

* * * * *